3,188,333
PREPARATION OF TETRAMETHYL LEAD
Francis M. Beaird, Jr., and Paul Kobetz, Baton Rouge, La., assignors to Ethyl Corporation, New York, N.Y., a corporation of Virginia
No Drawing. Filed June 6, 1963, Ser. No. 285,856
4 Claims. (Cl. 260—437)

This invention relates to a new and improved process for the synthesis of a tetramethyllead product, and a catalyst system therefor.

It is known that the tetraalkyllead compounds can be made by the reaction of an alkali metal lead alloy and an alkyl halide, such as a mono sodium lead alloy, NaPb, and an alkyl chloride, viz.:

This synthesis reaction has been employed for an appreciable period for making large amounts of tetraethyllead. The chemical reaction is operative for other tetraalkylleads, and recently considerable interest has developed in the manufacture and use of tetramethyllead, which is an appreciably more volatile lead antiknock compound.

The indicated chemical reaction, applied to the manufacture of tetramethyllead is operative, but only very low yields are obtained without a catalyst. In addition, the synthesis of tetramethyllead presents much more drastic control requirements, and requires more rigorous control than the corresponding type of synthesis of tetraethyllead, because of the substantially higher vapor pressure of tetramethyllead and of the methyl chloride used in its synthesis. A substantially improved procedure for the synthesis of tetramethyllead is disclosed in U.S. Patent 3,049,558 by Cook et al. According to the Cook et al. process, a controlled quantity of a class of inert liquid hydrocarbons, provides, in the presence of a catalyst, appreciably greater yields than are achieved when no inert hydrocarbon is present. The hydrocarbons generally are those having an atmospheric boiling point of about 90–150° C. and these are employed in relatively small concentrations based on the lead in the alloy charged. Aluminum type catalysts are highly effective catalysts.

According to the Cook et al. process, yields of the order of 60–75 percent can be obtained, in reaction periods of less than about seven hours.

The foregoing improved process has been quite successful, and yields of 60 to 70 percent are frequently obtained. Such yield levels of course provide ample opportunity for further improvement in this regard.

A problem encountered in tetramethyllead synthesis is frequent difficulty in discharge of reaction mass from commercial scale autoclaves. By reaction mass is meant the mixture of materials present in a reaction zone or autoclave at the termination of reaction, which mixture includes the aforementioned subdivided lead, the tetramethyllead product, alkali metal chloride, minor amounts of non-reacted chloride, and trace impurities or additives. Also present in the reaction mass, is the inert hydrocarbon customarily employed. The major component of the reaction mass is subdivided lead, owing to the above mentioned stoichiometry of the synthesis reaction. The reaction mass resembles a granular mixture and is discharged from autoclaves by rotation of agitator devices having plow elements for transport of the reaction mass to a discharge nozzle or valve. In the course of commercial operations, considerable difficulty has frequently been encountered in this respect. Another difficulty has arisen from the fact that, after using aluminum containing catalysts, apparently the reaction mass also contains a residual amount of active alkyl-aluminum component which is quite susceptible to oxidation or other reaction. This is manifested by fuming or smoking of the reaction mass when exposed to gaseous atmospheres, even when such atmospheres are relatively free of oxygen. Such fuming necessitates the extensive use of particularly pure inert gas to partly alleviate the problem. The fuming or smoking is especially disadvantageous in that such fumes appear to deposit solids in subsequent heat exchanger equipment, which significantly fouls and reduces the capacity of such equipment. Apparently even commercial gases considered sufficiently pure to be classed "inert" included impurities of a fume initiating or inducing type.

The general object of the present invention is to provide a new and improved process for the manufacture of tetramethyllead by the reaction of a sodium lead alloy and methyl chloride. An additional object is to provide new and novel catalyst systems for implementing and benefitting the indicated synthesis. Other objects will appear hereinafter.

The process of the present invention involves reacting a sodium lead alloy and methyl chloride, in the presence of a catalyst system which includes an aluminum compound composed of aluminum, carbon and hydrogen, plus methylal, $(CH_3O)_2CH_2$, as a supplemental adjuvant or promoter.

The aluminum catalysts employed for the process are hydrocarbon aluminum compounds consisting of the elements aluminum, carbon and hydrogen, and having at least one hydrocarbon radical attached to the aluminum atom and usually at least two as is illustrated herein. Typical hydrocarbon aluminum compounds which are highly effective include trimethyl aluminum, triethyl aluminum, diethyl aluminum hydride, tri-n-propyl aluminum, tri-n-butyl aluminum, tri-isobutyl aluminum, di-isobutyl aluminum hydride, triphenyl aluminum, trioctyl aluminum, tidecyl aluminum, tridodecyl aluminum, didecyl aluminum hydride, and others.

The second component of the improved catalyst system, as already mentioned, is methylal, or dimethoxymethan, $(CH_3O)_2CH_2$.

Batch or cyclic operating techniques are preferred for carrying out any particular embodiment of the process. In such techniques, a reaction autoclave is charged with subdivided solid sodium lead alloy, usually the monosodium lead alloy although some variation from this is permissive. Then the catalyst components are charged, usually in conjunction with a minor quantity of an inert hydrocarbon material, generally in the proportions of about four or five to about twenty weight percent of the lead in the alloy. The catalyst system, as already indicated, includes in all instances, an aluminum halogen free catalyst in conjunction with the methylal adjuvant or promoter.

Several different modes of introducing the catalyst system to the reaction zone are available. A preferred mode of addition involves providing both the aluminum catalyst and the methylal in full at the beginning of the reaction.

As already stated, the initial charge usually includes an inert hydrocarbon liquid in limited proportions. The hydrocarbon is highly beneficial in that high yields are realized at lower pressures than would be encountered in the absence of the hydrocarbon and the thermal stability of the product is improved. Preferably, the hydrocarbon is an aromatic type liquid, commercial toluene being a particularly beneficial example.

After the above described charge, the reactor is sealed, except for necessary venting connections, the temperature is raised to, usually, 65° or above, while the system is agitated, and methyl chloride is fed. The methyl chloride in some cases is charged all at one time, and in other cases is fed in over a deliberate finite period. The total methyl chloride is provided in proportions of at least one stoichiometric requirement or theory, and usually, a substantial excess is used. It will be understood that this refers to the total quantity fed during batch operations. During portions of such cyclic operations, only minor quantities of methyl chloride may be present, when the feed is "spread out" over a finite period.

The materials thus charged together are then reacted at temperatures averaging from about 85 to 110° C. Agitation is provided throughout the reaction period, as the reacting system includes solids and volatile liquids. The reaction is continued to apparent completion, requiring from about one hour and less than seven hours. The exact time requirement is effected by the configuration of the apparatus, the degree of agitation, the quantity of alloy to be reacted, and by other factors.

On completion of the reaction, the autoclave and contents are cooled and discharged, and the tetramethyllead is recovered from the lead and alkali metal chloride components of the reaction mass. The hydrocarbon additive or minor diluent employed in the synthesis reaction is recovered concurrently with the tetramethyllead.

In all cases an aluminum catalyst as described is used plus the methylal adjuvant. The aluminum catalyst is provided in proportions giving 0.02 to about 0.3 weight percent aluminum content, based on the sodium lead alloy used. A preferred range is from about 0.05 to 0.3 weight percent, an even more preferred range being from 0.1 to 0.25 weight percent aluminum. The precise proportions of the aluminum catalyst in any specific example depends, of course, on the composition and molecular weight thereof.

With respect to the methylal promoter, its ratio to the aluminum component is not highly critical. Highly effective results are obtained from about one-tenth to as high as ten moles per atom of aluminum in the aluminum catalyst. Lower and higher proportions can be used, with appreciably less benefit, or with no supplemental benefits, respectively. It will be appreciated that the concentrations throughout this range are in catalytic proportions, owing to the low concentrations of the aluminum catalyst. A preferred proportion of the methylal component is from about one-fourth to four moles per atom of aluminum, an even more preferred range being from about one-half to three moles per gram atom.

The present invention results in the attainment of high ultimate yields, frequently higher than normally encountered. Other benefits are also realized. For comparison purposes, a series of "base line" or normal operations were conducted to provide a reference basis for contrast when following the procedure of the present invention.

An autoclave was charged with 1,000 parts of comminuted monosodium lead alloy, containing 10 weight percent sodium. A mixture of an aluminum type catalyst, dissolved in anhydrous toluene was then charged, while agitating the contents of the autoclave. The said solution was provided in proportions of about 54 parts toluene by weight, and the aluminum catalyst was charged in proportions of about 0.24 weight percent aluminum content based on the alloy charged. According to the identity of the aluminum catalyst, of course, the weight of the catalyst compound would be varied. Thus, in the case of using methyl aluminum sesquichloride, $(CH_3)_3Al_2Cl_3$, as the aluminum catalyst, a typical concentration was about 0.93 weight percent of the sodium lead alloy charged.

The charge thus established was then sealed in the autoclave and preheated to about 95° C., and then methyl chloride was fed to the autoclave interior. The temperature was controlled below about 110° C., and the methyl chloride was fed during a period of less than about 30 minutes in proportions corresponding to 1.7 "theories," or about 370 parts by weight per 1000 parts of the alloy charged.

Upon completion of the reaction, after reaction for a period of approximately two hours, the contents of the autoclave were cooled and removed from the interior. The amount of tetramethyllead produced was determined by extracting from the reaction mixture, or reaction mass, with a hydrocarbon solvent, with titration of the tetramethyllead by an iodine analysis of an aliquot of the liquid extract. Alternatively, in some instances, the reaction mass was subjected to steam distillation, for separation of the tetramethyllead from the excess lead powder and sodium chloride component of the reaction mass.

A series of operations as above described was carried out, using the procedure indicated and with occasional slight variation in the amount of catalyst provided. Using triethyl aluminum as the catalyst, the average yield obtained was 77.9 percent, and when using methyl aluminum sesquichloride as catalyst in comparable concentrations, the average yield was 76.8 percent.

The reaction mass attained in the above described base line runs was quite reactive, in that, when portions were exposed to the available nitrogen gas supply as an atmosphere, considerable smoking occurred. In addition frequent difficulty was encountered in discharging the autoclave in that the reaction mass was sticky and gummy and tended to adhere to the vessel walls and agitator.

The following working examples illustrate the present process.

Example 1

The procedure employed in the foregoing base line run was again followed, except that in addition to the monosodium lead alloy, and toluene, the reactor was charged with triethyl aluminum and methylal. The triethyl aluminum was in the proportions of 1.00 weight percent, based on the alloy, or about 0.24 weight percent expressed as the aluminum content. Also charged was methylal in proportions of 1.26 moles per gram atom of the aluminum charged. The reaction started reasonably promptly, and provided the good yield of 78.3 percent. The reaction mass generated was relatively free flowing and easily discharged from the autoclave, and was substantially free of a smoking and fuming tendency in the presence of a gaseous atmosphere having fume-initiating impurities therein such as minor traces of oxygen or moisture.

Example 2

The operation of the foregoing example was repeated, except that the concentration of the methylal was reduced to approximately on-half, thus giving a mole ratio of 0.6 mole per gram atom of the aluminum in the triethyl aluminum. A longer induction period was experienced, but the ultimate yield was slightly higher than in the preceding examples and the reaction mass characteristics again were quite favorable.

Example 3

An additonal operation was then carried out in which the concentration of triethyl aluminum was reduced to one-half the concentration in the preceding Examples 1 and 2, but the methylal concentration was the same as in Example 2. Thus, the operation used a mole ratio of 1.23 mole methylal per gram atom of aluminum, approximately the same as in Example 1, but at the lower catalyst system concentration. The yield was good, but below the yields in Examples 1 and 2, being about 67 percent.

Example 4

In this operation the same triethyl aluminum concentration as in Example 3 was used but the methylal produced was again reduced to .25 weight percent, providing a feed ratio of 0.75 moles methylal per gram atom of aluminum. A good yield was obtained, almost as high as in Example 3.

When the foregoing operations are repeated, but substituting other specimens of the aluminum catalyst previously mentioned, similar results are achieved. Thus, instead of the triethyl aluminum, dimethyl aluminum hydride, trimethyl aluminum, tri-n-propyl aluminum, dihexyl aluminum hydride, trioctyl aluminum, triphenyl aluminum and other aluminum compounds consisting of aluminum, carbon and hydrogen, can be substituted in any of the foregoing examples in comparable concentrations and good results will be achieved with respect to yield, the absence of smoking or fuming and the relative ease of discharge of the autoclave.

What we claim is:

1. The process of manufacture of tetramethyllead comprising reacting as essentially the sole reactants sodium lead alloy with methyl chloride in the presence of a catalyst system including a hydrocarbon aluminum compound consisting of aluminum, hydrogen and carbon, and a promoting quantity of methylal said hydrocarbon aluminum compound having at least one hydrocarbon radical attached to the aluminum atom, and with the radicals attached to the aluminum atom being selected from the group consisting of alkyl, phenyl and hydrogen.

2. The process of claim 1 further defined in that the hydrocarbon aluminum compound is in a concentration providing aluminum in the proportions of from about 0.02 to 0.3 weight percent of the alloy, and the methylal is in proportions of 0.1 to 10 moles per atom of aluminum.

3. Process for manufacture of tetramethyllead comprising reacting as essentially the sole reactants sodium lead alloy and methyl chloride in the presence of a catalyst system including triethyl aluminum in proportions corresponding to about 0.5 to 3 weight percent aluminum based on the alloy and methylal in the proportions of about 0.5 to 3 moles per atom of aluminum.

4. A reaction mass derived from the reaction of a sodium lead alloy and methyl chloride as essentially the sole reactants in the presence of a catalyst and reaction system including an inert hydrocarbon liquid, a hydrocarbon aluminum catalyst consisting of carbon, hydrogen and aluminum, and methylal, said reaction mass being characterized by the relative freedom from fuming and smoking when exposed to gaseous atmospheres having smoke initiating reactants therein said hydrocarbon aluminum catalyst having at least one hydrocarbon radical attached to the aluminum atom, and with the hydrocarbon radicals attached to the aluminum atom being selected from the group consisting of alkyl, phenyl and hydrogen.

References Cited by the Examiner
UNITED STATES PATENTS

| | | | |
|---|---|---|---|
| 2,905,646 | 9/59 | Natta et al. | 252—431 |
| 2,989,487 | 6/61 | Truett | 252—431 |
| 3,057,897 | 10/62 | Robinson | 260—437 |
| 3,072,694 | 1/63 | Tullio | 260—437 |

TOBIAS E. LEVOW, *Primary Examiner.*